United States Patent [19]

Sanders

[11] Patent Number: 6,132,485
[45] Date of Patent: Oct. 17, 2000

[54] SOIL NUTRIENT COMPOSITIONS AND METHODS OF USING SAME

[76] Inventor: John Larry Sanders, 13044 W. Choctaw Trail, Lockport, Ill. 60441

[21] Appl. No.: 09/162,013

[22] Filed: Sep. 28, 1998

[51] Int. Cl.[7] .................................................. C05D 9/02
[52] U.S. Cl. ................... 71/61; 71/63; 71/64.13
[58] Field of Search ................... 71/61, 64.13, 63

[56] References Cited

U.S. PATENT DOCUMENTS

| | | | |
|---|---|---|---|
| 3,206,297 | 9/1965 | O'Connor | 71/61 |
| 3,360,355 | 12/1967 | Horsley et al. | 71/61 |
| 3,923,489 | 12/1975 | Richardson | 71/61 |
| 4,210,437 | 7/1980 | Windgassen et al. | 71/61 |
| 4,321,079 | 3/1982 | Ott | 71/61 |
| 4,334,906 | 6/1982 | Young . | |
| 5,383,951 | 1/1995 | Cross et al. | 71/61 |
| 5,433,766 | 7/1995 | Ming et al. | 71/64.11 |
| 5,571,303 | 11/1996 | Bexton | 71/34 |

OTHER PUBLICATIONS

Follett et al., Fertilizers and Soil Amendments, pp. 357, 365, 371, 377, 390 (1981), (no month).

*Primary Examiner*—Wayne Langel
*Attorney, Agent, or Firm*—Hovey, Williams, Timmons & Collins

[57] ABSTRACT

Compositions and methods for lowering the pH of soil are provided wherein the compositions comprise ammonium sulfate, elemental sulfur, and a micronutrient selected from the group consisting of zinc, iron, manganese, copper, boron, cobalt, vanadium, selenium, silicon, nickel, and mixtures thereof. In the preferred embodiment, the compositions are in granulated form and are applied to the soil so as to create lower pH microenvironments within the soil without decreasing the pH of the overall bulk soil surrounding the microenvironments. In the microenvironments, the micronutrients are readily available to the roots of plants and are taken up by the plants with increased efficiency, thus reducing the quantity of micronutrients required to be applied to the soil.

12 Claims, No Drawings

SOIL NUTRIENT COMPOSITIONS AND METHODS OF USING SAME

BACKGROUND OF THE INVENTION

1. Field of the Invention

The present invention is broadly concerned with compositions and methods for lowering the pH of soil microenvironments so as to increase the micronutrient uptake of growing plants. The compositions of the invention are preferably granulated and comprise ammonium sulfate, elemental sulfur, and a micronutrient selected from the group consisting of zinc, iron, manganese, copper, boron, cobalt, vanadium, selenium, silicon, nickel, and mixtures thereof In the preferred methods of the invention, granulated compositions are applied to the soil resulting in the formation of acidic soil micro-environments, while the soil surrounding the microenvironments retains its original pH. Such localized low pH conditions lead to an increased availability and plant uptake of the important micronutrients. In an alternative embodiment, non-granulated compositions can be utilized when it is desirable to decrease the overall pH of bulk soil.

2. Description of the Prior Art

In order to maintain healthy growth, plants must extract a variety of elements from the soil in which they grow. These elements include the so-called micronutrients zinc, iron, manganese, copper, boron, cobalt, vanadium, selenium, silicon, and nickel. However, many soils lack sufficient quantities of these micronutrients or contain them only in forms which can not be readily taken up by plants. To counteract these deficiencies, sources of the deficient element(s) are commonly applied to soils in order to improve growth rates and yields obtained from crop plants. This application has generally been accomplished using oxides, sulfates, oxysulfates, chelates, and other formulations.

In ordinary agricultural soil, pH's vary from about 4.5 to 8.3. Soils having pH's below 6.5 are normally subjected to liming to bring the pH of the soil to neutral or near-neutral. Liming is necessary for the availability of many macronutrients (such as nitrate, phosphates, magnesium, and especially calcium). However, when lime is applied, the availability of micronutrients is generally decreased due to the formation of insoluble products. This is especially true if over-liming occurs. Similarly, fields with naturally occurring pH's in excess of 7 have restricted availability of micronutrients due to the formation therein of insoluble reaction products (fixation). It is known that the availability of most micronutrients increases as the pH decreases. In the past it has been impractical to utilize the knowledge that an acid environment can provide enhanced availability of micronutrients. One reason is that, although micronutrient availability is enhanced by low pH's, maximum crop yields are normally obtainable at higher pH's.

In order to compensate for the lack of available micronutrients, many farmers apply excess amounts of fertilizers containing those micronutrients to the soil. Farmers may however apply expensive foliar applications which may solve the problems, but at a high cost to the farmer. The micronutrients (which are generally fixed or become unavailable when applied to soils) often limit the uptake of the macronutrients. The macronutrients may then wash off or leach out of the soil and contaminate the groundwater or surface water.

SUMMARY OF THE INVENTION

The instant invention overcomes the problems described above by combining ammonium sulfate, elemental sulfur, and micronutrients into compositions capable of providing an acid-forming microenvironment in soil, without decreasing the overall bulk soil pH. Preferably, the compositions are granular in form to provide the low pH, high micronutrient uptake soil microenvironments. Alternately, if it is desirable to decrease the overall bulk soil pH, non-granulated compositions (i.e., a fine particle mixture) can be used.

In more detail, the micronutrient compositions of the invention (both granulated and non-granulated) comprise ammonium sulfate, elemental sulfur, and a micronutrient selected from the group consisting of zinc, iron, manganese, copper, boron, cobalt, vanadium, selenium, silicon, nickel, and mixtures thereof Preferred micronutrients are zinc, boron, iron, copper, and manganese, with zinc, boron, iron, and manganese being particularly preferred. The preferred ranges of concentrations of each of the components of the compositions are set forth in Table 1.

While the non-granulated composition itself is useful for decreasing the overall pH of the bulk soil, it is a particular advantage of the instant invention that the composition can be formed into granules for situations where it is desirable to decrease the pH in only small portions of the soil, while not affecting the overall bulk soil pH. Broadly, granulated composites in accordance with the invention can be formed by granulating a mixture comprising ammonium sulfate, elemental sulfur, and a micronutrient selected from the group consisting of zinc, iron, manganese, copper, boron, cobalt, vanadium, selenium, silicon, nickel, and mixtures thereof. The granulation of the mixture can be carried out using any known granulation method. One preferred method of forming granulated composites in accordance with the invention involves mixing ammonium sulfate, elemental sulfur, and the desired micronutrient(s) to form a mixture, and then adding a chemical reactant to the mixture. Suitable chemical reactants include sulfuric acid, phosphoric acid, or anhydrous ammonia (or any chemical reactant which will react with the mixture to generate heat and thus initiate a chemical binding reaction). The resulting mixture is then processed in any granulation machinery known in the art, including but not limited to rotary drum granulators, rotary pan granulators, fluid bed granulators, or prilling towers. As the chemical reactions proceed, the granules will harden.

If a physical granulation method is preferred, the same procedure can be followed as described above for chemical granulation with the exception that, instead of adding a chemical reactant to the mixture, a binding agent (such as lignosulfonates or attapulgite clay) is added to the mixture. If the use of physical or chemical binding agents is not desirable, the ammonium sulfate, elemental sulfur, and desired micronutrient(s) can be ground to a relatively fine mesh size (generally from about 0.005 mm to about 1.0 mm) and mixed together. The resulting mixture is then processed through rollers exerting pressures onto the mixtures of from about 20,000 to about 60,000 lbs/in$^2$. The sheets or ribbons of processed material are broken into small pieces by a chain mill or other device. These pieces can then be screened into groups of uniform sizes before drying.

The preferred micronutrients and the preferred concentration ranges of the components making up the granulated composites are the same as those described for the non-granulated composites above. The micronutrient granules of the instant invention should have a bulk density of from about 30–100 lbs/ft$^3$, preferably from about 45–85 lbs/ft$^3$, and more preferably about 60 lbs/ft$^3$. The granules should have a water solubility of from about 10–100%, preferably from about 20–95%, and more preferably from about 25–90%. The largest surface dimension of the granules is preferably from about 0.1–30 mm, more preferably from about 0.1–3.0 mm, and most preferably from about 1.5–3.0 mm. While these ranges are preferred, those skilled in the art will recognize that the granule size can be varied according to the crop with which it will be used.

The granulated and non-granulated composites of the invention can be applied to the soil by any method known in the art which suits the needs of the farmer, including by broadcast application, banded application, sidedress application, with-the-seed applications, or any combination of these application methods.

While the non-granulated compositions will decrease the overall bulk soil pH, the granulated composites provide intimate contact between the components of the granules, resulting in a unique, localized acid microenvironment that increases the availability of the micronutrients (i.e., zinc, iron, manganese, copper, boron, cobalt, vanadium, selenium, silicon, nickel). When applied to the soil as a fertilizer, the microenvironment will have a pH distinct from the pH of the bulk soil surrounding the microenvironment. As the plant roots randomly grow throughout the soil, they will encounter these microenvironments, allowing access to the readily available micronutrients while simultaneously permitting the roots to absorb other nutrients (such as nitrogen or phosphorous) from the non-acidified bulk soil surrounding the microenvironment.

When the granulated composites of the invention are applied to soil, the resulting microenvironments should have a soil pH of from about 3–7, preferably from about 4–6, and more preferably from about 5–6. Expressed another way, the pH within the microenvironments should be from about 1–4, and preferably from about 2–3 pH units lower than the pH of the bulk soil (i.e., soil surrounding the microenvironments but whose pH has been essentially unaffected by the granules). The pH of the microenvironment should remain acidic (i.e., pH of less than 7) for at least about 30 days, preferably at least about 60 days, and more preferably for from about 90–120 days after the granule has been contacted with the soil, The granulated composites can be randomly distributed throughout the soil (as are the roots of the growing plants), however, it is preferred that the granulated composites be distributed in a quantity such that a sufficient number of low pH microenvironments are formed to allow an adequate number of plant roots to contact the microenvironment, and thus access the readily available micronutrients. Therefore, it is preferred that there be from about 1–100 microenvironments per cubic foot of soil, more preferably from about 10–50 microenvironments per cubic foot of soil, and most preferably from about 12–40 microenvironments per cubic foot of soil. Preferably, the microenvironments (formed by granules whose largest surface dimensions are from about 1.5–3.0 mm) are of such a size that the largest dimensions of the microenvironment average from about 5–10 mm, more preferably from about 4–8 mm, and most preferably from about 3–6 mm.

Because the microenvironments are acidic, the micronutrients from the granules are more readily available, and thus are more efficiently taken up by the plant roots. Those skilled in the art will appreciate that this efficiency allows for a substantial decrease in the quantity of micronutrients required, saving money for the farmer. Specifically, use of the granulated composites in accordance with the methods of the invention results in a decrease of at least about 25% by weight per acre, preferably at least about 35% by weight per acre, and more preferably at least about 50% by weight per acre, in the quantity of at least one of the micronutrients within the composites in comparison to the quantity of the respective micronutrient which would be required using compositions and methods known in the art.

TABLE 1

| Component | Broad Range[a] | Preferred[a] |
| --- | --- | --- |
| ammonium sulfate | 5–49% by wt. | 10–25% by wt. |
| elemental sulfur | 2.5–49% by wt. | 5–25% by wt. |
| zinc | 0.02–74% by wt. | 1–40% by wt. |
| manganese | 0.02–55% by wt. | 2–40% by wt. |
| copper | 0.02–74% by wt. | 1–40% by wt. |
| iron | 0.02–55% by wt. | 1–40% by wt. |
| boron | 0.02–18% by wt. | 0.05–12% by wt. |
| nickel | 0.015–0.025% by wt. | 0.01–0.02% by wt. |
| cobalt | 0.002–0.02% by wt. | 0.005–0.01% by wt. |
| silicon | 1–25% by wt. | about 20% by wt. |
| selenium | 0.005–.2% by wt. | about 0.125% by wt. |
| vanadium | 0.005–.2% by wt. | about 0.09% by wt. |
| sulfuric acid | 5–25% by wt. | 10–15% by wt. |

[a]Approximate percent by weight, based upon the total weight of the composition taken as 100% by weight.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

EXAMPLE 1

Preparation of a 20% Copper Micronutrient Composition

The following ingredients were added to a rotary drum granulator and mixed until substantially homogeneous: 400 lbs of ammonium sulfate; 818 lbs of zinc oxide reactant (10% zinc); 432 lbs copper oxide; and 200 lbs elemental sulfur. After mixing, 286 lbs of sulfuric acid was added to the mixture in the granulator to form a semi-liquid slurry. The granulator (which was angled with its mouth positioned slightly above the horizontal) was then rotated in order to form the slurry into granules. As the granules reached the appropriate size, they rolled out of the mouth of the granulator drum. The formed granules were heated in a dryer (to approximately 200–250° F.) causing the excess moisture to evaporate and hardening the granule. After drying, the granules were passed over a series of vibrating screens in order to obtain only granules having a size of from 1.5–3.0 mm. The granules outside this size range were then crushed and reprocessed as described above. Those granules having the appropriate sizes were then sprayed with a coating of lignosulfonate in order to increase hardness and reduce dust formation.

EXAMPLE 2

Preparation of a 20% Zinc Micronutrient Composition

The following ingredients were mixed in a pug mill mixer mixed until substantially homogeneous: 400 lbs of ammonium sulfate; 854 lbs of zinc oxide reactant (10% zinc); 397 lbs zinc oxide (76% zinc); and 200 lbs elemental sulfur. The resulting mixture was added to a rotary drum granulator, followed by the addition of 286 lbs of sulfuric acid to the granulator. All of the ingredients were mixed in the granulator until a semi-liquid slurry was formed. The granulator was then rotated in order to form the slurry into granules, which then exited the mouth of the drum (positioned slightly above the horizontal). The formed granules were heated in a dryer (to approximately 200–250° F.) evaporating the excess moisture and hardening the granules. After drying, the granules were passed over a series of vibrating screens in order to obtain granules having a size of at least 3.0 mm. The granules outside this size range were then crushed and reprocessed as described above. Those granules having the appropriate size were sprayed with a coating of lignosulfonate.

EXAMPLE 3

Tests were conducted to determine the effects of various micronutrient combinations on soil pH's and micronutrient uptakes by soybeans. Those combinations were: ammonium sulfate with a micronutrient mix; elemental sulfur with a micronutrient mix; and a combination of ammonium sulfate and elemental sulfur with a micronutrient mix. The micronutrient mixes contained Zn, Fe, Mn, and Cu in such amounts that the following quantities of each were applied per acre: 1 lb Zn, 0.5 lb Fe, 0.5 lb Mn, and 0.5 lb Cu. In each run, twenty pounds of sulfur was applied to each acre of soil. The sulfur applied in each run was obtained in the following variations: twenty pounds of sulfur from $(NH_4)_2SO_4$; twenty pounds of sulfur that was elemental sulfur; and a combination of ten pounds of sulfur from $(NH_4)_2SO_4$ and ten pounds of sulfur that was elemental sulfur. Each combination was applied to the soil by banded applications at planting. The soil pH and leaf tissue was tested at 60 days after planting. The results from these tests are set forth in Table 2 below. Treatment (III) decreased the soil pH 0.5 units more than treatment (I), and treatment (III) decreased the soil pH 1.2 units more than treatment (II). This in turn led to a large increase in the uptake of Zn, Fe, Mn, and Cu by the plant subjected to treatment (III) in comparison to those plants subjected to treatments (I) or (II).

TABLE 2

| | | Soybean Uptake - ppm | | | |
|---|---|---|---|---|---|
| Treatment | Soil pH | Zn | Fe | Mn | Cu |
| Control | 7.4 | 37 | 70 | 48 | 5 |
| (I) 20 lbs. from $(NH_4)_2SO$[a] | 6.1 | 42 | 98 | 73 | 7 |
| (II) 20 lbs. from S[b] | 6.8 | 39 | 84 | 57 | 6 |
| (III) 20 lbs. Combination[c] | 5.6 | 49 | 160 | 82 | 9 |

[a]Twenty pounds of sulfur per acre, with the sulfur being obtained from $(NH_4)_2SO_4$.
[b]Twenty pounds of sulfur per acre, with the sulfur being elemental sulfur.
[c]Twenty pounds of sulfur per acre, with ten pounds of the sulfur being obtained from $(NH_4)_2SO_4$ and ten pounds of the sulfur being elemental sulfur.

I claim:

1. A soil nutrient composition comprising an ammonium sulfate, elemental sulfur, and a micronutrient selected from the group consisting of zinc, copper, and mixtures thereof, the amount of said micronutrient present in said composition on a weight basis being greater than the amount of said ammonium sulfate, and said amount of micronutrient being a majority of the composition on a weight basis.

2. The composition of claim 1, said micronutrient selected from the group consisting of zinc oxide and copper oxide.

3. The composition of claim 1, said micronutrient comprising a mixture of zinc oxide and copper oxide.

4. A soil nutrient composition comprising an ammonium sulfate, elemental sulfur, and a micronutrient selected from the group consisting of zinc, copper, and mixtures thereof, the amount of said micronutrient present in said composition on a weight basis being greater than the amount of said ammonium sulfate, and said amount of micronutrient being a majority of the composition on a weight basis.

5. The composition of claim 4, said micronutrient selected from the group consisting of zinc oxide and copper oxide.

6. The composition of claim 4, said micronutrient comprising a mixture of zinc oxide and copper oxide.

7. A composite comprising a self-sustaining body formed of a mixture comprising ammonium sulfate, elemental sulfur, and a micronutrient selected from the group consisting of zinc, copper, and mixtures thereof, the amount of said micronutrient present in said composition on a weight basis being greater than the amount of said ammonium sulfate, and said amount of micronutrient being a majority of the composition on a weight basis.

8. The composition of claim 7, said micronutrient selected from the group consisting of zinc oxide and copper oxide.

9. The composition of claim 7, said micronutrient comprising a mixture of zinc oxide and copper oxide.

10. A composite comprising a self-sustaining body formed of a mixture comprising ammonium sulfate, elemental sulfur, and a micronutrient selected from the group consisting of micronutrients containing zinc, iron, manganese, copper, boron, cobalt, vanadium, selenium, silicon, nickel, and mixtures thereof, the amount of said micronutrient present in said composite on a weight basis being greater than the amount of said elemental sulfur, and said amount of micronutrient being a majority of the composite on a weight basis.

11. The composite of claim 10, said micronutrient selected from the group consisting of zinc oxide and copper oxide.

12. composite of claim 10, said micronutrient comprising mixture of zinc oxide and copper oxide.

* * * * *

UNITED STATES PATENT AND TRADEMARK OFFICE
CERTIFICATE OF CORRECTION

PATENT NO. : 6,132,485
DATED : October 17, 2000
INVENTOR(S) : Larry Sanders

It is certified that error appears in the above-identified patent and that said Letters Patent is hereby corrected as shown below:

Column 6,
Lines 2, and 13, please delete the word "an"
Line 18, please delete "ammonium sulfate" and substitute therefor -- elemental sulfur --
Lines 28, and 31, please delete "composition" and substitute therefor -- composite --
Lines 39-41, please delete "micronutrients containing zinc, iron, manganese, copper, boron, cobalt, vanadium, selenium, silicon, nickel" and substitute therefor -- zinc, copper --

Signed and Sealed this

Fifth Day of February, 2002

Attest:

JAMES E. ROGAN
*Attesting Officer*   *Director of the United States Patent and Trademark Office*